Patented Nov. 7, 1950

2,528,732

UNITED STATES PATENT OFFICE 2,528,732

REACTION PRODUCTS OF DIESTERS OF DITHIOPHOSPHORIC ACID AND MINERAL OIL COMPOSITIONS CONTAINING THE SAME

Frederick B. Augustine, Jefferson, N. J., assignor to Socony-Vacuum Oil Company, Incorporated, a corporation of New York No Drawing. Application January 31, 1947, Serial No. 725,730

10 Claims. (Cl. 252—46.6)

This invention relates to a new process of preparing certain reaction products from diesters of dithiophosphoric acids and certain unsaturated organic compounds, and to mineral oil compositions including the products so prepared.

Prior to this invention the diesters of dithiophosphoric acid were known and had been added in minor quantities to mineral oil, mainly for the purpose of stabilizing the oil. However, these esters have not been entirely satisfactory for this purpose because of their high acidity, their tendency to corrode metals such as copper, and their effect of causing sludge formation in oils. On the other hand, the neutral triesters of dithiophosphoric acid are relatively difficult and expensive to prepare.

Accordingly, it is the purpose of this invention to provide a new and expedient process for producing certain new reaction products from esters of dithiophosphoric acid and certain unsaturated organic compounds, which reaction products are highly useful addition agents for oil.

To this end the present invention comprises the reaction of diesters of dithiophosphoric acid with organic compounds which contain one or more sets of multiple bonds and in which at least one multiple bond occurs in an essentially straight chain of carbon atoms, which chain is at least four and preferably at least eight carbon atoms in length.

Diesters of dithiophosphoric acid can be prepared in a number of ways, but the most generally used method is that of reacting a compound containing an hydroxy group, for example, an alcohol or a phenol, with phosphorus pentasulfide. This reaction proceeds essentially as follows:

$$4ROH + P_2S_5 \rightarrow 2(RO)_2PSSH + H_2S$$

As organic hydroxy compounds for reaction with the phosphorus pentasulfide, normal straight chain alcohols, branched chain alcohols, hydroxy aryl compounds, such as phenol and naphthol, substituted aryl hydroxy compounds, such as diamyl phenol, or any other hydroxy organic material in which the hydroxy group will react with the phosphorus pentasulfide, may be used.

In order to avoid the possibility of the diester reacting with itself to form condensation products or polymers which are outside of the scope of this invention, the organic  droxy compounds which are reacted with phosphorus pentasulfide to form the diesters should not contain multiple bonds in carbon atom chains that are four or more carbon atoms long. Thus, the alcohols to be used are preferably saturated alcohols and the substituted aryl hydroxy compounds are aryl hydroxy compounds substituted by saturated alkyl radicals, only. Double bonds in the aryl nuclei do not appear to lead to the polymerization or condensation of the diester with itself as will be indicated by Example VI. Even the presence of double bonds in a two or three carbon atom alkyl chain does not lead to the formation of condensation products or polymers.

In a similar manner, any organic material containing a mercaptan radical may be reacted to produce a thioester corresponding to the oxygen esters described above.

It has now been discovered that the products, the manufacture of which has been described above, can be expediently converted into far less acid, or completely non-acid, products of a far more useful nature, by reacting them with organic material which contains one or more sets of multiple bonds in an essentially straight chain of carbon atoms which is not less than four carbon atoms, and preferably not less than eight carbon atoms, in length.

A wide variety of unsaturated organic compounds are useful for this purpose, including many that have functional groups in addition to multiple bonds. Wax olefin, ocenol, oleic acid and its esters and salts, linseed oils, soy-bean oil, unsaturated hydrocarbons derived from paraffin wax, unsaturated alcohols, and numerous naturally occurring oils and synthetically made oils, which contain multiple bonds, are all satisfactory. It appears to be necessary only that the multiple bond, or at least one multiple bond, occur in the part of the compound in which there is a straight or essentially straight chain of carbon atoms at least four carbon atoms in length and preferably eight carbon atoms or more in length.

Any one of these unsaturated compounds, when heated with an ester of dithiophosphoric acid, reacts to form a material which is less acid than the original dithiophosphoric acid ester, which blends better with mineral oil and other compounds than did the original dithiophosphoric acid ester, and which otherwise has new and desirable characteristics. The reaction is preferably accomplished at 100° C. to 200° C. and is generally complete within 2 to 3 hours.

Example I 100 g. of di(2-ethylhexyl)dithiophosphoric acid (neutralization number 128, expressed as milligrams of potassium hydroxide equivalent to 1 g. of sample) and 108 g. of wax olefin (a compound prepared by the dehydrochlorination of chlorinated petroleum wax) having an iodine number of 107, were heated 3 hours at 150° C. The product had a neutralization number of 7 and contained 4.07% phosphorus and 8.24% sulfur.

Example II 177 g. of di(2-ethylhexyl)dithiophosphoric acid and 160 g. of ocenol (essentially oleyl alcohol) were heated for 3 hours at 150° C. Some hydrogen sulfide was evolved but the loss in weight was less than 3 g. The product had a neutralization number of 23.5 and contained 4.60% phosphorus and 7.98% sulfur.

Example III

For comparison with the results of Example II, 90 g. of stenol (the saturated alcohol corresponding to ocenol) were heated with 118 g. of di(2-ethylhexyl)dithiophosphoric acid for 3 hours at 150° C. The neutralization number of the product was 62, which is just about that of the original acid diluted by the stenol. Apparently no reaction took place.

Example IV 177 g. of di(2-ethylhexyl)dithiophosphoric acid and 106 g. of linseed oil were heated 3 hours at 150° C. The product had a neutralization number of 12 and contained 4.86% phosphorus and 9.17% sulfur.

Example V

That di(2-ethylhexyl)dithiophosphoric acid does not change in neutralization number, significantly, because of heating, was demonstrated by maintaining a quantity of the acid at 150° C. and determining its neutralization number from time to time. This batch of acid, originally prepared by heating 4 mols of 2-ethylhexanol and 1 mol of phosphorus pentasulfide for 1 hour at 150° C. had a neutralization number of 139. After 2 hours additional heating at 150° C. the neutralization number was 123 and after 3 more hours at the same temperature it was 117.

Example VI 4 molecular proportions of diamyl phenol and 1 molecular proportion of phosphorus pentasulfide were heated at 150° C. for 2½ hours. The product, bis(diamylphenyl)dithiophosphoric acid had a neutralization number of 80.

180 g. of this acid and 113 g. of wax olefin were heated at 150° C. for 3 hours. The product had a neutralization number of 10 and contained 3.33% phosphorus and 6.55% sulfur.

In order to test the effectiveness of the materials prepared in stabilizing mineral oils, several of the products were incorporated in a furfural-refined distillate turbine oil of 150 seconds viscosity S. U. V. at 100° F. and the oil subjected to the Brown-Boveri turbine test.

The Brown-Boveri turbine tests were conducted in a suitable oil bath in which were placed 400 ml. tall form beakers provided with glass covers containing a central hole for the entrance of air. A polished copper plate (70 x 40 x 1 mm.) was bent into a V shape and placed in the beaker so that the 70 mm. edge formed the base. 200 ml. of the test oil was placed in each beaker and air passed over the surface of the test oil at a rate of 2 liters per hour. The temperature of the oil was maintained at 230° F. for 72 hours and then reduced to room temperature for 24 hours.

The Lovibond color, neutralization number, sludge (in mg.) and condition of the copper, at the end of the test, were noted. Sludge was reported as: none=0 mg.; 1=0–6 mg.; 2=6–25 mg.; 3=over 25 mg. In each instance 0.5% of the product was added to the oil.

| Composition | Color (Lovibond) | Neutralization Number | Sludge | Copper |
|---|---|---|---|---|
| Oil alone | 27 | .29 | 2 | OK |
| Oil+product of Example I | 1 | .03 | 0 | OK |
| Oil+product of Example II | 0.5 | .02 | 0 | OK |
| Oil+product of Example IV | 1 | .01 | 2 | OK |

A bubble test was conducted for the purpose of measuring the corrosion of hard metal bearings by an oil including the new compounds. This test was conducted in a 200 x 25 mm. test tube in which was placed a standard test piece of bearing having a cadmium-silver alloy surface and weighing about 6 g. With it was placed 30 g. of the test oil and a 5 mm. glass inlet tube drawn down to about 1 mm. inside diameter for about 30 mm. at one end was used to carry air to the bottom of the test tube. The whole assembly was held at 175° C. for 22 hours and air blown through the inlet tube and into the bottom of the oil bath at a rate of 2 liters per hour during that time. The test piece was then removed and weighed to determine any loss in weight, which was reported in milligrams of weight loss.

The oil used for this purpose was a blend of Pennsylvania neutral and residuum stocks separately refined by means of chlorex and then blended to give an S. A. E. 20 motor oil having a specific gravity of 0.872, a flash point of 435° F., and a Saybolt Universal Viscosity of 318 seconds at 100° F.

A sample of this oil without additive was tested concurrently with samples containing additive in each one of the following runs. The results obtained were as follows:

| Composition | Mg. Loss in Weight | Mg. Loss in Weight with Oil Alone |
|---|---|---|
| Oil+0.25% product of Example I | 2 | 24 |
| Oil+0.25% product of Example II | 2 | 24 |
| Oil+0.25% product of Example IV | 0 | 26 |
| Oil+0.25% product of Example VI | 3 | 22 |

Lauson oxidation stability tests were conducted in a Lauson single cylinder, four cycle, liquid cooled gasoline engine with jet lubrication. This engine uses ½ gallon of oil, the oil temperature under operating conditions is 280° F., jacket temperature 212° F., speed 1815 R. P. M., throttle setting, ¼ open, air-fuel ratio, 13:1, length of the test, 36 hours. No oil is added during the test. The fuel used is 100% straight run gasoline plus 2.5 cc. of tetraethyl lead. The oil used in this test was a solvent-refined S. A. E. 10 grade motor oil having a kinematic viscosity of 5.75 at 210° F., and a flash point of 415° F. The neutralization number (milligrams of potassium hydroxide required to neutralize one gram of oil) and the viscosity were determined at the end of the test as an indication of the deterioration that had taken place in the oil.

| Composition | Neutralization Number After 36 Hours | Kinematic Visc. at 210° F. After 26 Hrs. |
|---|---|---|
| Oil alone | 8.0 | 8.44 |
| Oil+1.0% product of Example I | 1.4 | 6.06 |
| Oil alone | 8.2 | 7.89 |
| Oil+1.0% product of Example II | 0.8 | 5.86 |
| Oil alone | 9.1 | 7.89 |
| Oil+1.0% product of Example IV | 1.6 | 6.07 |

Copper strip corrosion tests and heat stability tests were performed on the products of the various examples, dispersed in mineral oil, and also on the products of the unreacted acid esters specified in several of these examples.

The copper strip corrosion test consists in placing a polished copper strip about 2" x 1½", bent into a V shape, in a 100 ml. beaker so that the flat surface of the strip does not touch the bottom or sides of the beaker. 50 ml. of oil are then placed in the beaker so as to completely cover the copper strip. The beaker is then placed in an electric oven for the specified length of time at a specified temperature. Thereafter the copper strip is removed and washed with petroleum ether and examined for corrosion. To pass this test, the strip must show no more than negligible discoloration after 3 hours and no more than moderate discoloration after 24 hours.

The heat stability test consists in maintaining an oil blend of the additive at 150° C. and observing for the appearance of sludge.

hibitors and any other additive or additives which it may be found desirable to add. Preferably, the reaction products of this invention are incorporated in lubricating oils in amounts ranging from 0.1% to 2%. In some cases, amounts as low as 0.01% are sufficient and in others amounts as high as 10% may be found desirable.

The lubricating oil base will normally be a mineral lubricating oil derived from petroleum and of the type used in the lubrication of internal combustion engines. However, the new reaction products may advantageously be incorporated in petroleum products ranging all the way from gasoline and kerosene to petrolatum and petroleum wax. They may also be incorporated in synthetic lubricants or lubricants derived from animal or vegetable sources, or other mineral sources than petroleum.

The concentrates prepared in accordance with this invention are mixtures of the reaction products of this invention with oils or oily materials compatible with the lubricating oil in which the reaction products are finally to be incorporated. In the concentrates, the amount of the reaction product may reach 50% or even higher, although it is generally preferred, for reasons of solubility, to use not more than 25% of the reaction product in such a concentrate. Other addition agents, such as mentioned above, may be incorporated in the concentrates along with the reaction products of this invention.

What is claimed is:

1. A mineral lubricating oil containing a minor proportion, sufficient to improve the stability thereof against deterioration by oxidation, of a

| Additive | Copper Strip Corrosion Test | | | Heat Stability Test | |
|---|---|---|---|---|---|
| | Conc. in S. A. E. 10 Oil | 3 Hrs. at 100° C. | 24 Hrs. at 100° C. | Conc. in S. A. E. 30 Oil | 65 Hrs. at 150° C. |
| | Per cent | | | Per cent | |
| Product of Example I | 1 | Passed | Passed | 1 | No sludge. |
| Product of Example II | 1 | do | do | 1 | Do. |
| Product of Example III | 1 | do | do | 1 | Do. |
| Untreated ester of Example V | 1 | Failed | Failed | 1 | Heavy Sludge. |
| Treated (but unreacted) ester of Example V | 0.5 | do | do | 0.5 | Do. |
| Unreacted ester of Example VI | 0.6 | do | do | 0.6 | Do. |
| Product of Example VI | 1 | Passed | Passed | 1 | No Sludge. |

It will be noted that the compositions that failed in the test were di(2-ethylhexyl)dithiophosphoric acid (before and after heating), and bis(diamylphenyl)dithiophosphoric acid (before reaction with an olefin). None of these has been treated with an unsaturated compound in accordance with this invention.

The present invention includes the method of preparing the reaction products described above, the reaction products so prepared, lubricating oil compositions containing a minor proportion sufficient to improve the characteristics thereof, and concentrates of the new reaction products in lubricating oil.

The lubricating oil compositions included within the scope of this invention comprise not only mixtures of lubricating oil and the reaction products of this invention alone, but also lubricating oil compositions including these two ingredients and in addition thereto other additives, such as pour point depressants, extreme pressure lubrication improvers, stabilizing agents, viscosity index improvers, detergents, rust inreaction product obtained from the reaction involving about one mol of a diester of dithiophosphoric acid in which all alkyl radicals in the diester are saturated, with one mol of an organic compound containing at least one double bond in a straight chain of carbon atoms at least four carbon atoms in length, said organic compound being selected from the group consisting of aliphatic hydrocarbons, alcohols, fatty acids and their esters, and containing not less than eight carbon atoms, at a temperature falling within the range varying between about 100° C. and about 200° C.

2. A mineral lubricating oil as defined in claim 1 in which the organic compound is a petroleum wax olefin.

3. A mineral lubricating oil as defined in claim 1 in which the organic compound is as unsaturated alcohol.

4. A mineral lubricating oil as defined in claim 1 in which the organic compound is an unsaturated vegetable oil.

5. A mineral lubricating oil as defined in claim 1 in which the minor proportion of the reaction product is between 0.01% and 10%.

6. A mineral lubricating oil as defined in claim 1 in which the minor proportion of the reaction product is between 0.1% and 2%.

7. A reaction product obtained from the reaction involving about one mol of a diester of dithiophosphoric acid in which all alkyl radicals in the diester are saturated, with one mol of an organic compound containing at least one double bond in a straight chain of carbon atoms at least four carbon atoms in length, said organic compound being selected from the group consisting of aliphatic hydrocarbons, alcohols, fatty acids and their esters, and containing not less than eight carbon atoms, at a temperature falling within the range varying between about 100° C. and about 200° C.

8. A reaction product as defined in claim 7 in which the organic compound is a petroleum wax olefin.

9. A reaction product as defined in claim 7 in which the organic compound is an unsaturated alcohol.

10. A reaction product as defined in claim 7 in which the organic compound is an unsaturated vegetable oil.

FREDERICK B. AUGUSTINE.

REFERENCES CITED

The following references are of record in the file of this patent:

UNITED STATES PATENTS

| Number | Name | Date |
|---|---|---|
| 2,063,629 | Salzberg et al. | Dec. 8, 1936 |
| 2,198,915 | MacAfee | Apr. 30, 1940 |
| 2,242,260 | Prutton | May 20, 1941 |
| 2,266,514 | Romieux et al. | Dec. 16, 1941 |
| 2,342,432 | Smith et al. | Feb. 22, 1944 |
| 2,388,199 | Williams et al. | Oct. 30, 1945 |
| 2,411,153 | Fuller | Nov. 19, 1946 |